E. BOLTON.
LOCKING DEVICE FOR NUTS AND THE LIKE.
APPLICATION FILED APR. 19, 1913.
1,124,388. Patented Jan. 12, 1915.
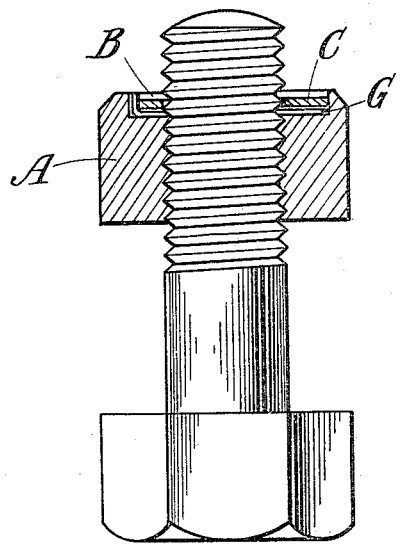
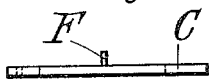
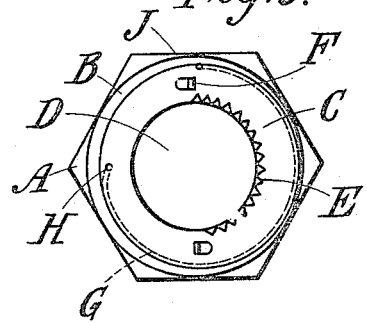
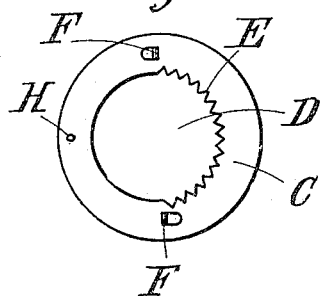
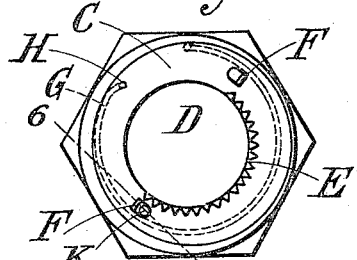
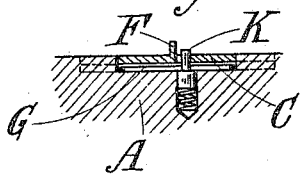
WITNESSES
J. K. Boulter
L. D. Wood
INVENTOR
Edwin Bolton
PER W. E. Boulter
ATTORNEY

UNITED STATES PATENT OFFICE.

EDWIN BOLTON, OF COVENTRY, ENGLAND.

LOCKING DEVICE FOR NUTS AND THE LIKE.

1,124,388.        Specification of Letters Patent.        Patented Jan. 12, 1915.

Application filed April 19, 1913. Serial No. 762,367.

*To all whom it may concern:*

Be it known that I, EDWIN BOLTON, a subject of the King of Great Britain, and resident of Coventry, in the county of Warwick, England, have invented certain new and useful Improvements in Locking Devices for Nuts and the like, of which the following is a specification.

This invention relates to locking devices for nuts and the like and has for its object to provide a simple locking device applicable if necessary to existing nuts which will prevent accidental unscrewing.

Nuts have been provided with wedges adapted to jam between the bolt and nut, such wedges taking the form of bars inserted in slots or recesses in the nut.

The present invention relates to this type of nut-locking device and its object is to provide an improved construction in which the nut is cut into as little as possible so that it may retain its strength.

According to this invention the wedge rotates and it comprises a washer with an eccentric hole lying in an eccentric recess in the nut. When there is any tendency to unscrew the nut the washer wedges between the side of the recess in the nut and the bolt and resists rotation.

Another advantage of the present construction is that the washer and recess are cheap to produce as the washer can be manufactured and the recess cut on a lathe.

In the accompanying drawings, Figure 1 is a side elevation with the nut shown in section. Fig. 2 is a side elevation of the wedge. Fig. 3 is a plan of the nut and wedge, and Fig. 4 is a plan of the wedge alone. Fig. 5 is a plan view showing means for holding the wedge in the inoperative position, while Fig. 6 is a section on the line 6—6 of Fig. 5.

Like letters indicate like parts throughout the drawings.

In this construction the top of the nut A is provided with a circular eccentric recess B. In this recess lies a washer or ring C, retained by burring over the sides of the recess or in any other manner. The hole D in the washer is eccentric to its periphery. The washer is thus thicker on one side of the bolt hole than on the other, and its inner periphery may be roughened as at E if required, while means may also be provided for effecting slight rotation of the washer when necessary. For this purpose the washer may be provided with upstanding lugs F which can be acted upon by any suitable tool to rotate the washer.

To apply the nut the washer is rotated so as to expose all the hole in the nut, and the nut is screwed home. To lock the nut the washer is rotated slightly until the annular wedge jams between the bolt and the side of the recess. If the nut is rotated to unscrew, the jamming effect is increased unless the washer is first rotated slightly so as to remove the wedging effect. Thus accidental movement of the nut is prevented.

The washer may be acted on by a spring G the outwardly turned ends of which engage holes H in the washer and J in the nut. This spring tends to rotate the washer into the wedging position. To disengage, the washer must be rotated against the action of the spring. When a spring is used it will be understood that locking automatically takes place directly when the rotation of the nut in the screwing up direction is stopped. That is to say, unscrewing of the nut is automatically prevented unless the spring is disengaged or the washer rotated slightly, to effect either of which any suitable means may be provided.

If desired means may be provided for positively holding the wedge in the inoperative position. For instance, the nut may be provided with an upwardly projecting spring pin K which, when the washer C is in the inoperative position and the hole D concentric, engages a hole in the washer adjacent to one of the lugs F. When the nut is screwed into place the spring pin K is pushed down, when the washer will fly into the jamming position and be locked by the spring G.

Obviously other means may be provided for holding the washer in the inoperative position.

What I claim as my invention, and desire to secure by Letters Patent, is:—

1. In combination, a bolt, a nut thereon provided in one face with an eccentric recess, a locking washer lying in said recess and provided with an eccentric hole and adapted to be rotated to cause the washer to wedge between the bolt on the one side and the said recess on the other, and a spring pin carried by the nut and adapted to project through an aperture in the washer when the latter is in inoperative position for the purpose specified.

2. In combination, a bolt, a nut thereon provided in one face with an eccentric recess, a locking washer lying in said recess and provided with an eccentric hole and adapted to be rotated to cause the washer to wedge between the bolt and the said recess, a spring acting upon the washer to automatically rotate it into the wedging position when the rotation of the nut in the screwing-up direction is discontinued, and a spring-pin carried by the nut and adapted to project through an aperture in the washer when the latter is in inoperative position, for the purpose specified.

In testimony whereof I have signed my name to this specification in the presence of two subscribing witnesses.

EDWIN BOLTON.

Witnesses:
 ERIC W. WALFORD,
 JOHN FAZAKARLEY.

Copies of this patent may be obtained for five cents each, by addressing the "Commissioner of Patents, Washington, D. C."